United States Patent
Bear et al.

(10) Patent No.: US 8,407,227 B2
(45) Date of Patent: Mar. 26, 2013

(54) METHOD FOR EXTRACTING AND STORING RECORDS OF DATA BACKUP ACTIVITY FROM A PLURALITY OF BACKUP DEVICES

(75) Inventors: Cory Bear, Bellevue, WA (US); Liam Scanlan, Bellevue, CA (US)

(73) Assignee: Bocada, Inc., Kirkland, WA (US)

( * ) Notice: Subject to any disclaimer, the term of this patent is extended or adjusted under 35 U.S.C. 154(b) by 274 days.

(21) Appl. No.: 12/262,099

(22) Filed: Oct. 30, 2008

(65) Prior Publication Data

US 2009/0055449 A1 Feb. 26, 2009

Related U.S. Application Data

(63) Continuation of application No. 10/625,333, filed on Jul. 22, 2003, now Pat. No. 7,457,833, which is a continuation of application No. 09/665,267, filed on Sep. 19, 2000, now Pat. No. 6,640,217.

(51) Int. Cl.
*G06F 17/30* (2006.01)

(52) U.S. Cl. .......................... 707/740; 707/645; 707/654

(58) Field of Classification Search .................. 707/644, 707/646, 647, 648, 645, 654; 714/13
See application file for complete search history.

(56) References Cited

U.S. PATENT DOCUMENTS

| | | |
|---|---|---|
| 4,751,702 A | 6/1988 | Beier et al. |
| 5,495,607 A | 2/1996 | Pisello et al. |
| 5,517,555 A | 5/1996 | Amadon et al. |
| 5,678,042 A | 10/1997 | Pisello et al. |
| 5,729,735 A | 3/1998 | Meyering |
| 5,754,782 A | 5/1998 | Masada |
| 5,758,359 A | 5/1998 | Saxon |
| 5,796,999 A | 8/1998 | Azagury et al. |
| 5,813,017 A | 9/1998 | Morris |
| 5,857,208 A | 1/1999 | Ofek |
| 5,875,478 A | 2/1999 | Blumenau |
| 5,890,165 A | 3/1999 | Boudrie et al. |
| 5,958,012 A | 9/1999 | Battat et al. |
| 5,974,563 A | 10/1999 | Beeler et al. |
| 6,006,227 A | 12/1999 | Freeman et al. |
| 6,026,414 A | 2/2000 | Anglin |
| 6,035,412 A | 3/2000 | Tamer et al. |

(Continued)

OTHER PUBLICATIONS

International Search Report for International No. PCT/US01/29435 filed Sep. 19, 2001.

(Continued)

*Primary Examiner* — Jean M Corrielus
(74) *Attorney, Agent, or Firm* — DLA Piper LLP (US)

(57) ABSTRACT

A method and system for requesting, cross-referencing, extracting and storing historical records of data backup activity by using a software component that interfaces to a plurality of data backup software devices is disclosed. In the first aspect, a method of storing automated request-for-historical records of data backup activity schedules is disclosed. In the second aspect, a method for invoking requests through a component that interfaces to a plurality of data backup software devices is disclosed. In the third aspect, a method for receiving historical records of data backup activity from said component is disclosed. In a fourth aspect, a method for making alterations to said historical records of data backup activity is disclosed. In a fifth aspect, a method for inserting said historical records of data backup activity into a data table located in an open, relational database is disclosed. In a sixth aspect, a method for inserting subsets of said historical records of data backup activity into tables related to said central data table is disclosed. In a seventh aspect, a method for removing completed historical records of data backup activity refresh requests is disclosed. Through the use of a system and method in accordance with the present invention, the aforementioned database can be made self-refreshing, requiring minimal ongoing intervention subsequent to initial configuration. In addition, the aforementioned data refreshes can be manually invoked at any time.

6 Claims, 7 Drawing Sheets

U.S. PATENT DOCUMENTS

| | | | |
|---|---|---|---|
| 6,038,379 A | 3/2000 | Fletcher et al. | |
| 6,038,569 A * | 3/2000 | Beavin et al. | 707/646 |
| 6,289,380 B1 | 9/2001 | Battat et al. | |
| 6,324,548 B1 | 11/2001 | Sorenson | |
| 6,460,055 B1 | 10/2002 | Midgley et al. | |
| 6,640,217 B1 * | 10/2003 | Scanlan et al. | 1/1 |
| 6,708,188 B1 * | 3/2004 | Bear et al. | 1/1 |

OTHER PUBLICATIONS

International Search Report for International No. PCT/US01/29434 filed Sep. 19, 2001.

International Search Report for International No. PCT/US01/29521 filed Sep. 19, 2001.

* cited by examiner (RT) zrequests fields

| |
|---|
| (RT1) request |
| (RT2) requestorname |
| (RT3) reference |
| (RT4) backupproductname |
| (RT5) status |
| (RT6) taskid |
| (RT7) requestdatetime |

FIG. 2

METHOD FOR EXTRACTING AND STORING RECORDS OF DATA BACKUP ACTIVITY FROM A PLURALITY OF BACKUP DEVICES

PRIORITY CLAIMS/RELATED APPLICATIONS

This application is a continuation of U.S. patent application Ser. No. 10/625,333 filed on Jul. 22, 2003 which in turn is a continuation of U.S. patent application Ser. No. 09/665,267 filed on Sep. 19, 2000 (now U.S. Pat. No. 6,640,217 issued on Oct. 28, 2003), the entirety of both of which are incorporated herein by reference.

This application is also related to U.S. patent application Ser. Nos. 09/665,270 and 09/665,269 (now U.S. Pat. Nos. 6,745,210 and 6,708,188), both of which are filed on the same date as this application (Sep. 19, 2000) and both of which name the same inventors as this application.

FIELD

The system and method are related generally to electronic/software data backup and more particularly to simultaneous and seamless examination of such data backup activity performed across a plurality of data backup software programs.

FEDERALLY SPONSORED RESEARCH

No federally sponsored research was involved in the creation of this invention.

MICROFICHE APPENDIX

No microfiche has been submitted with this patent application.

BACKGROUND

Most data backup software devices in use today provide for the repeated, regular electronic transfer, over a network, of data from the point at which it is in regular use to a medium, such a magnetic tape, for the purposes of securing a fall-back situation should damage occur to the original data. Included in the list of such software programs, are programs that work on relatively small amounts of data, sometimes on a one-computer-to-one-tape-drive basis, and others that work on very large amounts of data, with banks of tape drives that are used to back up data from potentially thousands of computers connected to a network. Mostly, these data backup software products use what is known as a "client/server" model. In the context of data backup, this means that there is one computer (the "server") that controls and manages the actual data backup activity, and other computers (the "clients") that get backed up by the "server". In this scenario, the data backup tape drives are usually connected directly to the backup "server". There is also usually more than one backup server, each of which is responsible for the backup of data of numerous clients.

A central function of the activity of data backup is the ability to "restore" data in the case of damage to the data that is in use. The backup server computer usually controls this restore process. Understandably, the time it takes to recover data, and the confidence that the data recovery process will succeed, are two critical aspects of the data backup and restore function as a whole. Disk drive capacities and data volumes, and consequently the volumes of data to be backed up, have historically been increasing at a greater rate than the backup server speed, tape drive capacity and network bandwidth are increasing to handle it. Accordingly, new technologies have been added to help. Such new technologies include fiber-optic cables (for fast data transfer across the network), faster chips, tape drives that handle more tapes, faster tape drives, "Storage Area Networks" and so on. The activity of data backup has become more and more critical, as the importance of the data has increased. At the advent of the desktop "revolution", that is, when people first started using personal computers (PCs), almost every piece of important data was still stored on one, single computer, possibly a mainframe or a minicomputer. As the numbers and types of computers proliferated, particularly on the desktop, and the purpose for which these desktops were now being used, making the data on such computers increasingly valuable, many different products designed to backup data were created and put into the marketplace. Now, there are some 50 or more data backup products in use by organizations and private individuals.

Generally, but not always, such data backup software devices (products) have a reputation for being difficult to use. When there is an exception to this, the data backup software product often has other, perhaps related, limitations (e.g. the amount of data is can back up is small). Not all data backup software devices perform the same function. Thus, it is frequently necessary to have two or more different types of data backup software programs in use within the same organization, especially in large organizations. Anecdotally, one company has as many as 17 different data backup software devices in use somewhere in their organization. This is referred to as fragmentation. In large organizations, is has become necessary to hire expensive expertise to manage such large data backup and restore services. The more varied their data backup devices, the more expensive this becomes. Also, for large organizations, it has become increasingly likely that scheduled data backup activities will fail. Because of the extra complexity of running a variety of data backup software devices, and because of the sheer number of data backup activities that need to take place regularly, failed data backups often go unnoticed in a sea of less-relevant data backup information.

An additional problem is that beyond a certain number of hours, perhaps minutes, if identifying a failed data backup takes too long, then it often becomes too late for meaningful corrective action to be taken. As a result, large organizations often take an expensive "best guess" approach. Anecdotally, the level of confidence that large organizations live with regarding data backup success is said to be about 80%. In other words, it is expected that no more that 4 out of 5 data backups will be successful. Almost every large organization will relate experiences where data was lost because they mistakenly believed the data was been backed up.

In the marketplace today there are several data backup reporting products available. Each works with only one data backup software device. There are no known patents relating to either of these two products. 1. Legato GEMS Reporter™, which provides trend analysis and text-based failures analysis. This product works with Legato NetWorker. It is built to handle up to approximately 4 or 5 average-sized backup servers. 2. Veritas Advanced Reporter™ 3.2 form Veritas is similar to GEMS Reporter. 3. SAMS Vantage™ provides statistical report from data backup activity of Computer Associates ArcServelT product.

Accordingly, an OPEN relational database is required to enable the cross-referencing of historical data backup activity across a plurality of data backup software devices. This is because to examine the data, 3.sup.rd party reporting/querying tools are generally used, and such tools generally only work with OPEN relational databases.

SUMMARY

In accordance with the present invention an automated software device for the extraction of historical records of data backup activity from a plurality of data backup software devices, and the storing of those records in a general-purpose relational database.

OBJECTS AND ADVANTAGES

Accordingly, besides the objects and advantages stated in our above patent, several objects and advantages of the present invention are: (a) Provides the ability to automate, requiring little or no further intervention, the regular and scheduled extraction of historical records of data backup activity from a plurality of data backup software devices. (b) Consolidates and cross-references the historical records of data backup activity into a single database, thereby providing the ability to create reports on data backup activity from a plurality of different data backup software devices. (c) Exposes those consolidated and cross-referenced historical records of data backup activity in an open relational database, thereby enabling users of the invention to use 3.sup.rd party reporting/querying products to create their own, perhaps unique reports. (d) Provides such consolidation of historical records of data backup activity without the need to install additional software devices at the source of those data records.

BRIEF DESCRIPTION OF THE DRAWING

FIG. 2: a list of the fields in the zrequests table.

DETAILED DESCRIPTION OF ONE OR MORE EMBODIMENTS

Terminology

"Batches" of Data

Figure 1:
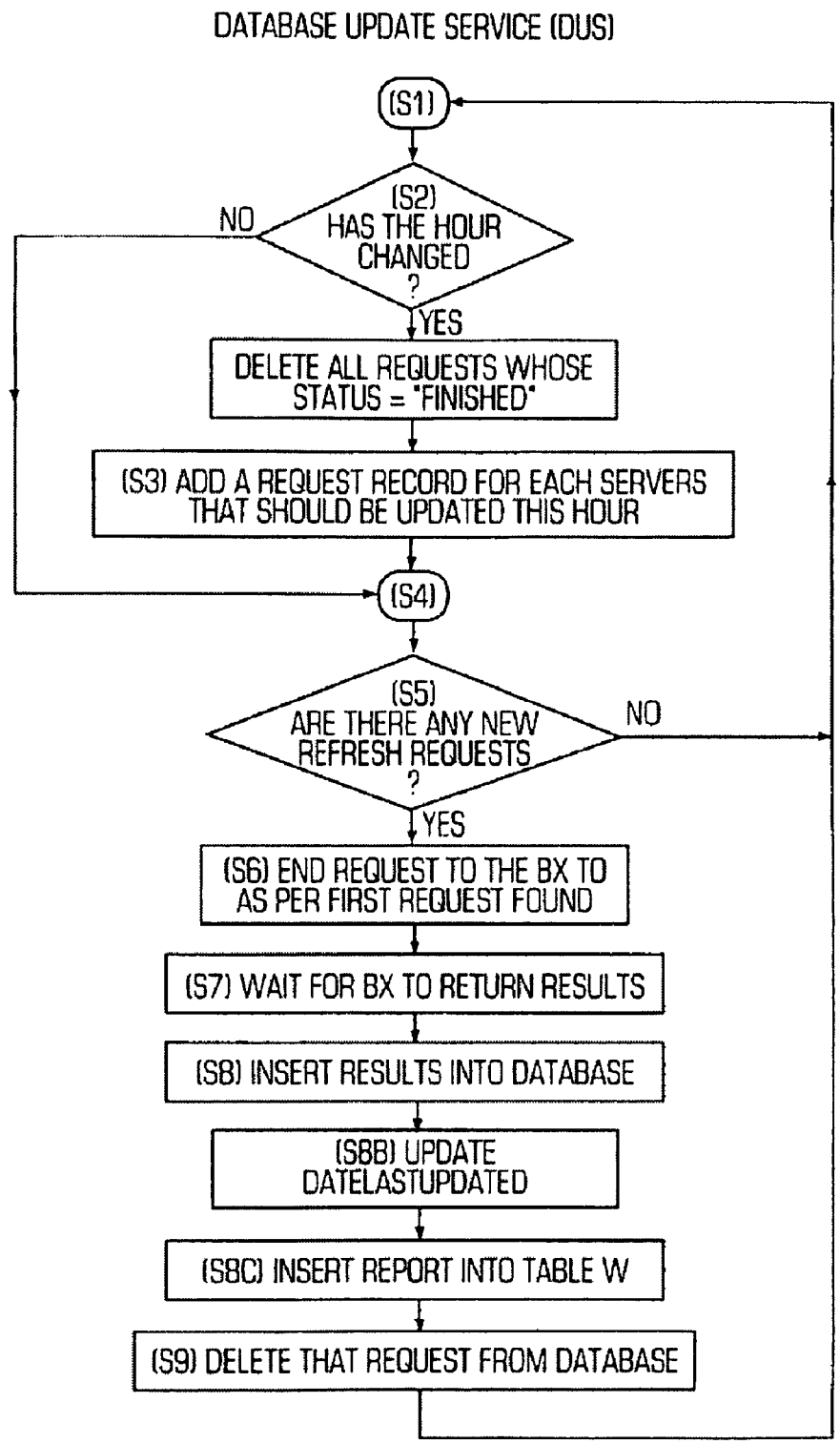
FIG. 1: A flowchart describing how historical records of data backup activity are requested and received from the Database Update Service (DUS), and then stored in the database.

In this document we refer to "batches" of data. This term means a collection of one or more records of the same format each containing an identical set of fields, each field having a different form, purpose and content from other fields in the same record, and each field containing potentially different data from the same field in other records in the batch.

"SQL" (Structured Query Language)

In this document there are several references to, and examples of, SQL statements that are routinely used in the Database Update Service (DUS) program. SQL, or "Structured Query Language" is a decades old "English language-like" computer language invented by IBM Corporation to facilitate the insertion, manipulation and retrieval of data in a database.

Typical SQL statements begin with words such as INSERT, or SELECT, or DELETE.

Using SQL statements, it is possible to "join" two (or more than two) related tables of data together with the intention of retrieving a batch of data that contains data from each of the tables. That is called a "JOIN", and examples of JOINs can be seen in this document.

There are several "versions" of SQL, but most of the versions are so similar that they are almost indistinguishable from one another. In the preferred embodiment, only the version known as ANSI SQL (American National Standards Institute SQL) is used.

Relational Database

A relational database allows the definition of data structures, storage and retrieval operations and integrity constraints. In such a database the data and relations between them are organized in tables. A table is a collection of records and each record in a table contains the same fields. Certain fields may be designated as "keys", which means that searches for specific values of that field will use indexing to speed them up.

Open Relational Database

An Open Relational Database is a relational database that is accessible using data analysis tools generally available on the market, for example, Crystal Reports™.

RDB

The term RDB, an acronym for Relational Database, is used throughout this document to represent the underlying source of data for reports described in this embodiment. The RDB contains historical records relating to backup activity across a plurality of backup engines. In the preferred embodiment, the RDB resides in an implementation of Microsoft SQL Server™. (described above).

Backup

The term Backup means the actual transfer of data that is in regular use, usually across a network, to a data storage medium, such as a magnetic tape, for the purposes of retrieval at a later date, should the data in regular use become damaged.

Backup Engine

The term Backup Engine means any software product or program that is used for the purposes of Backup described in the previous paragraph. For example, Legato NetWorker™, Veritas BackupExec™, BakBone NetVault™.

BX

This term is used throughout this document to denote a software component that provides an interface to a plurality of backup engines. By connection, it is meant the ability to request and receive historical records of backup activity from those backup engines. This software component is not part of this invention, but is described in detail in the accompanying patent application referenced at the beginning of this application. In the preferred embodiment described in this document, BX behaves as described in that patent application.

DESCRIPTION OF ONE OR MORE EMBODIMENTS

FIG. 1

There is a program called Database Update Service (referred to hereafter as "DUS" in this document) running "in the background" on the computer. Running in the background allows the user of the computer to proceed with other tasks while someone may be using the computer to perform other tasks (for example, creating a spreadsheet). This is possible because DUS does not need any direct user intervention in order to operate. In the preferred embodiment, it runs as a Windows NT Service.

Every several seconds, the program "wakes up" (see FIG. 1 S1), and checks if the hour has changed from the last time it checked it a few seconds ago (see FIG. 1 S2), in other words, has the current time on the computer passed to a new hour of the day. The program gets the hour by using this short piece of standard Delphi program code:

Every time it is checked, it is stored in memory so that it can be compared for any change with the next time the hour is retrieved a few seconds later.

If the Hour has Changed

First, all records in the table RT (see FIG. 2) with a status field RT5 (see FIG. 2) with the value "Finished" are deleted using a SQL statement understood by any person familiar to the art. Then, if the hour has changed, it scans the servers table ST (see FIG. 3) looking at field ST4 (see FIG. 3).

Figure 3:
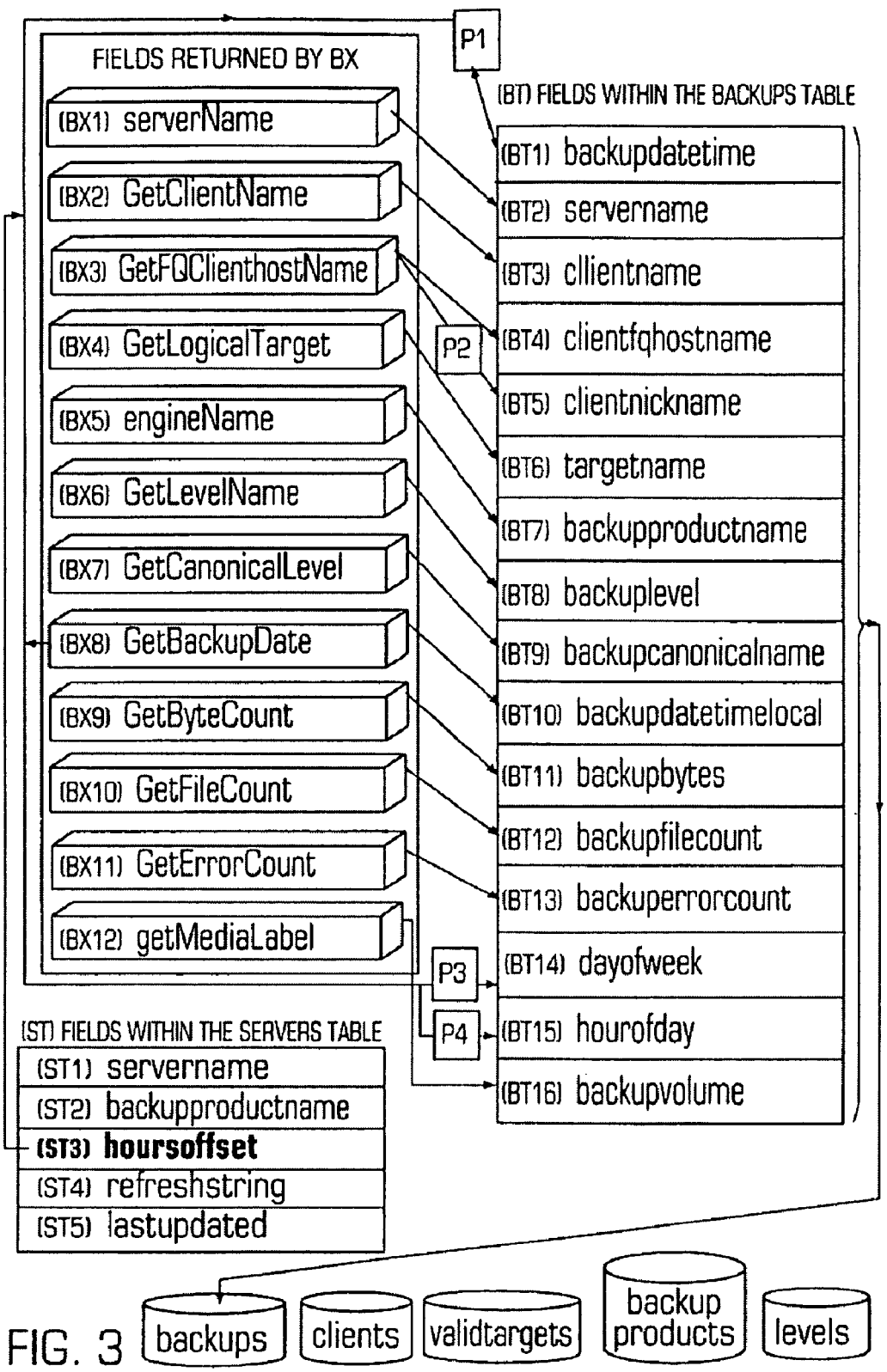
FIG. 3: A list of the fields returned by the embedded BX showing where each field flows to, where processes p1, p2, p3 and p4 are applied to some of the fields. It also illustrates which fields in the backups table record those data are inserted into. It also shows a list of fields in the servers table (ST) with an indication of the field ST3 being used.
Figure 4:
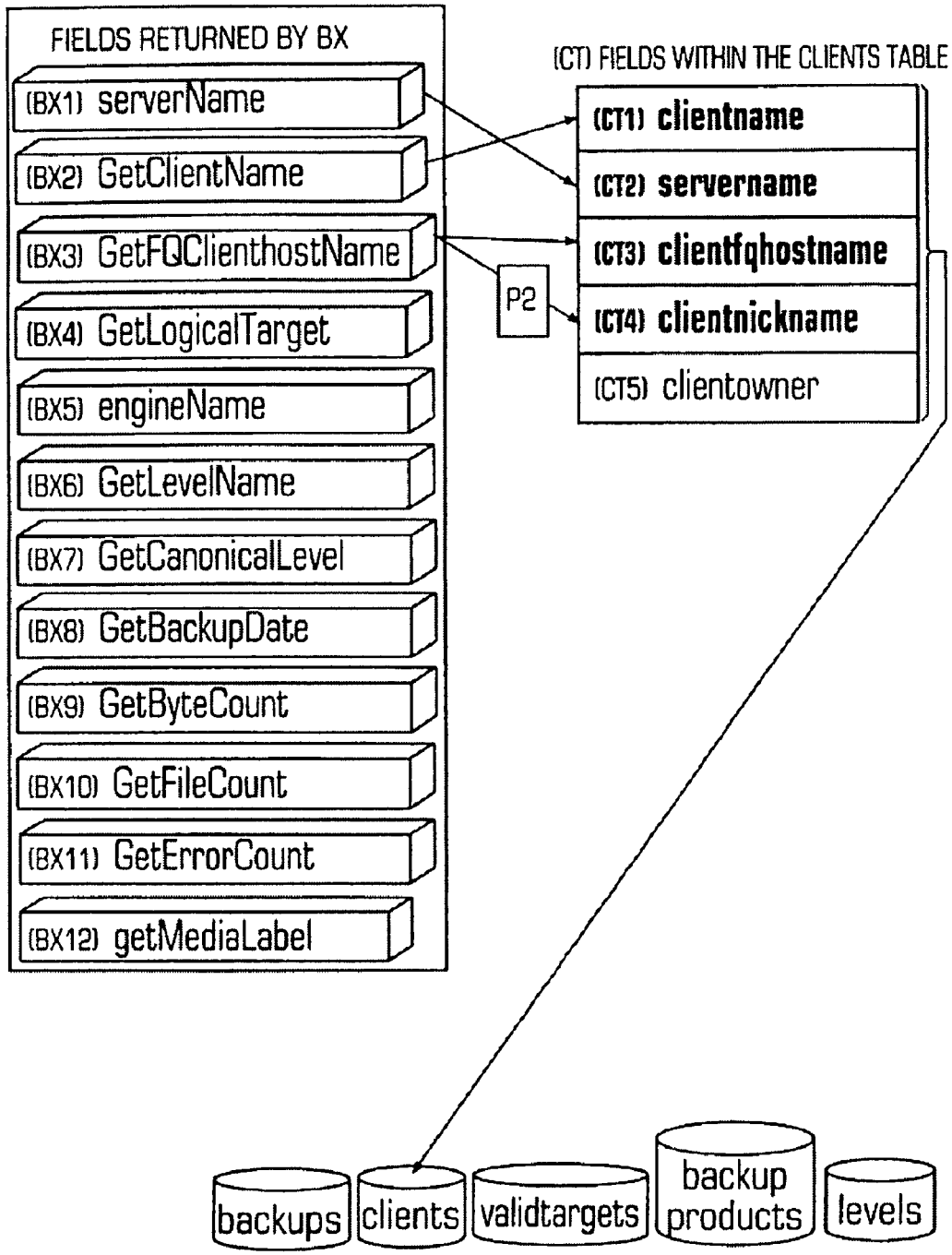
FIG. 4: A list of the fields returned by the embedded BX showing where each field flows, where process p2 is being applied to field CT4. It also shows which fields in the clients table (CT) those fields are inserted into.
Figure 5:
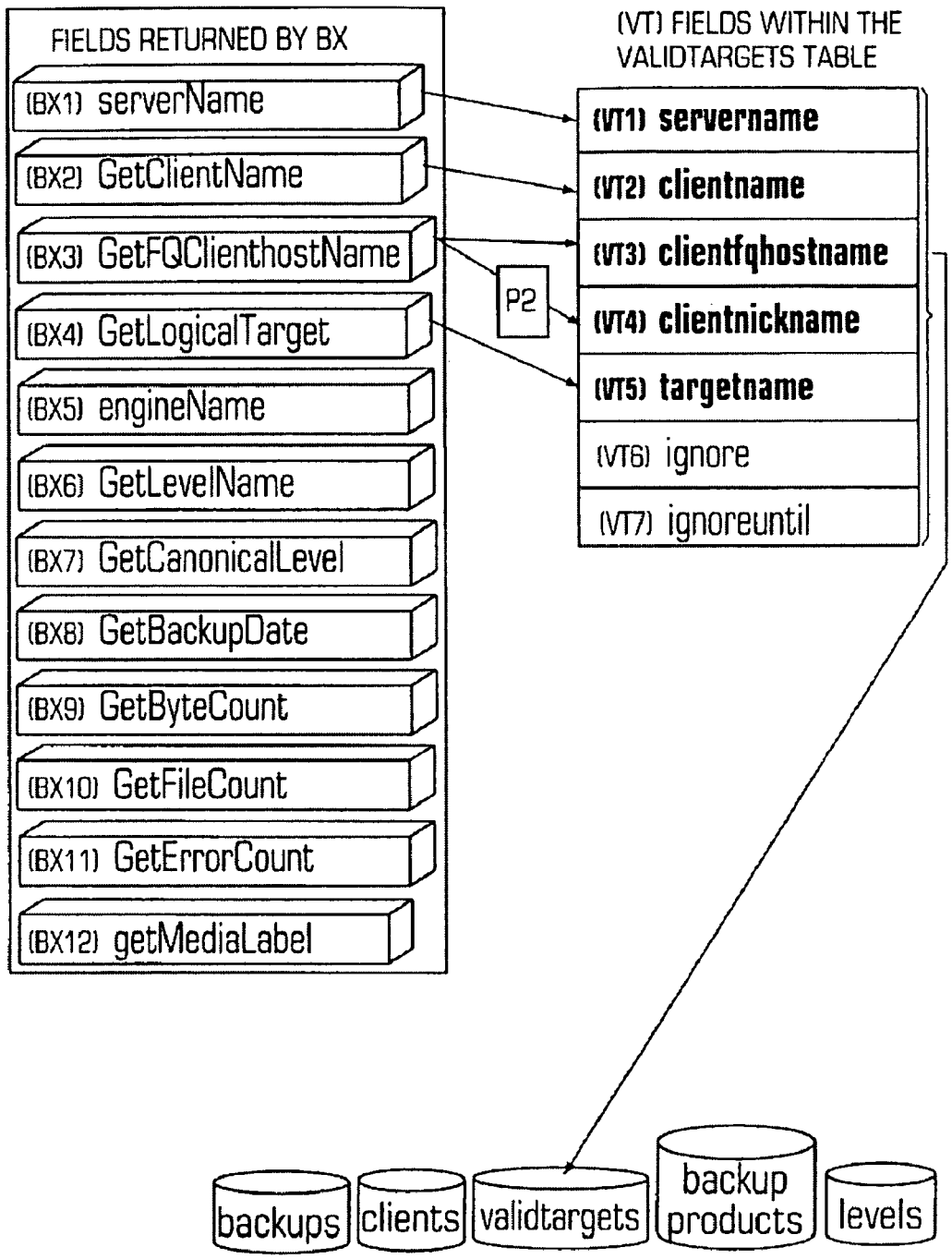
FIG. 5: A list of the fields returned by the embedded BX showing where each field flows. It also shows which fields in the validtargets table (VT) those fields are inserted into.
Figure 6:
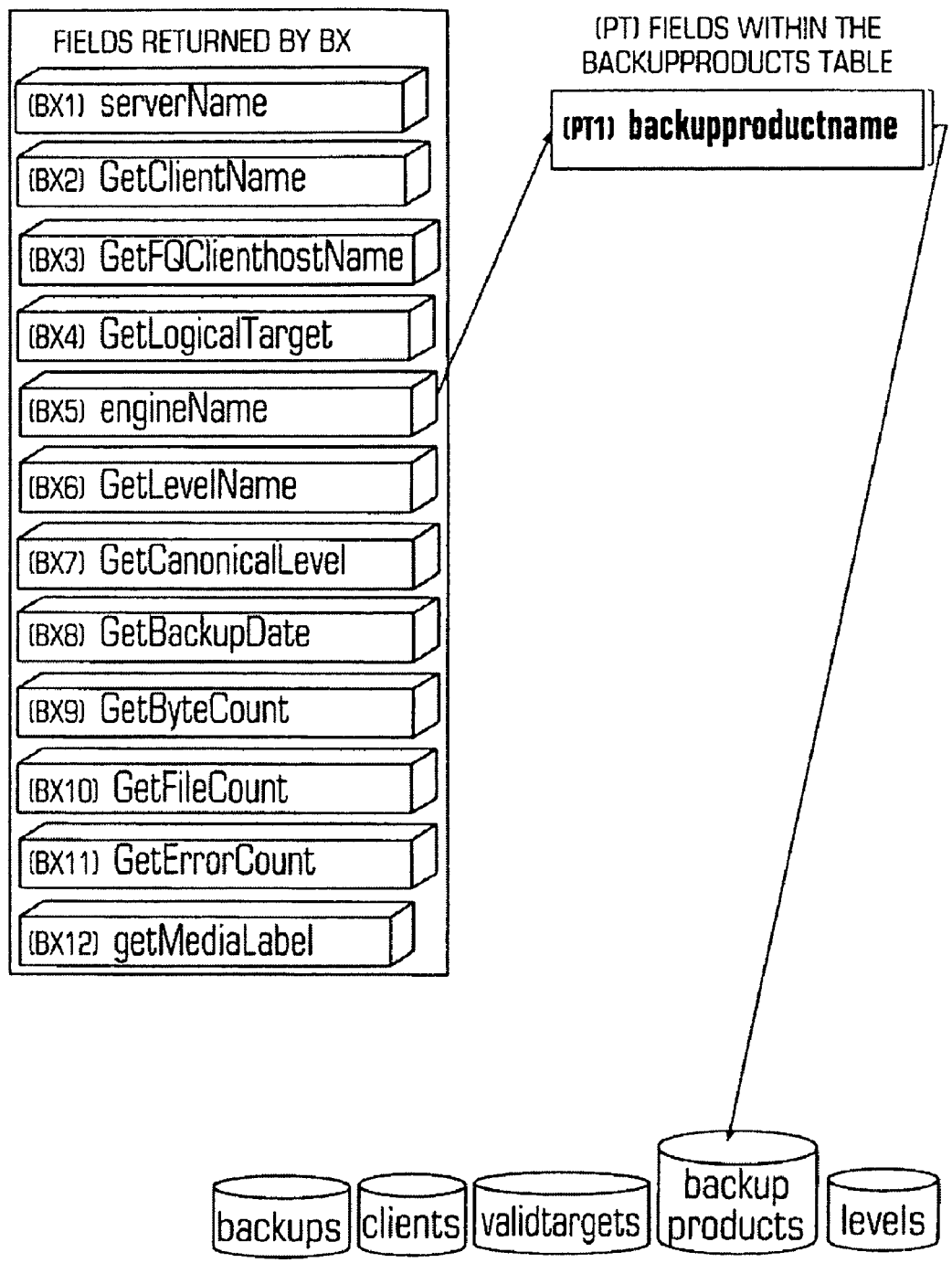
FIG. 6: A list of the fields returned by the embedded BX showing where each field flows. It also shows which fields in the backupproducts table (PT) those fields are inserted into.

In the preferred embodiment, for each hour of the day there is a digit in field ST4 (see FIG. 3). Hour 0 (any time between midnight and just before 1 AM) is represented by the first digit; 3 AM is represented by the $4^{th}$ digit, and so on. Typically, the string might look like this:

000100000000000000000010

Note that there are 24 digits, each of which can be either 0 or 1.

In the above example, the program would automatically create a request for update at 3 AM and at 10 PM every day because the $4^{th}$ and $23^{rd}$ digits are set to "1".

If a particular hour's digit is "1", then it means that a refresh must be requested S3 (see FIG. 1) at that hour. This is done by programmatically inserting a record into the tableRT (see FIG. 2) for that server/backup product combination.

In the preferred embodiment, for optimization, a SQL statement is created that links directly to field ST4 (see FIG. 3) and if a given hour is 1, then a request is inserted. This is what the SQL statement will typically look like:

---

INSERT INTO zrequests (request, reference, backupproductname,
    requestorname, status, tasked, requestdatetime)
SELECT 'Refresh', servers.servername, servers.backupproductname,
    'SYSTEM (scheduled)', 'Waiting', 0, '8/24/00 07:00:06'
FROM servers WHERE SUBSTRING (refreshstring,7,1) = '1'

---

The SQL syntax above is standard ANSI SQL and can be understood by anyone familiar with average experience of the SQL language.

Checks for any Refresh Requests

The next thing DUS checks RT5 (see FIG. 2) is whether there is at least one refresh request in the table RT (see FIG. 2) whose status field RT5 (see FIG. 2) is set to "Waiting".

Sends Refresh Request to the BX

If there is at least one record in the table RT, then the first request it finds is taken, and a request is made of the BX for specific historical records of data backup activity.

In the preferred embodiment, to economize on resources, the request specifies a "from date", in other words, the date on which (and after which) historical records of data backup activity from the server should be retrieved. This "from date" is taken from field ST5 (see FIG. 3). How the . request to BX is made is detailed in the next paragraph.

This request to the BX for historical records of data backup activity is very simple, and in the form of BX.RequestBackupLogs, which requires as arguments the name of the server, the name of the data backup product and the date since which historical records of data backup activity is to be retrieved. The BX, to acknowledge its receipt of the request, returns a field RT6 (see FIG. 2). It also "flags" that request as being "in progress" by changing that request record's status field RT5 to "in progress".

Waits for BX to Get Historical Records of Data Backup Activity and Return them

The program then waits until BX returns the results of that request before doing anything else.

When the results are returned, they come in the form of a "batch" of records, each having an identical format to one another. Alternatively, there may be an error (such as a network failure) or there may be no historical records of data backup activity to return. In either case, DUS changes the field RT5 (see FIG. 2) to the value "Finished" for the record whose taskid is the one DUS just processed.

In the preferred embodiment, changing a request in field RT5 (see FIG. 2) in table RT (see FIG. 2) to "Finished" is done by constructing a SQL Statement that changes the record whose taskid is the one that was supplied by BX and we just finished with. The typical SQL statement to do this looks like this:

"UPDATE zrequests SET status="Finished" WHERE
    taskid=1001"

Cycles Through Batch of Records from BX

DUS then cycles through each record in the batch, and for each of those records, prepares a record for insertion into each of 5 different tables, BT, CT, VT, PT, LT, in the database, and illustrated in FIGS. 3, 4, 5, 6 and 7, respectively. Each table is of a different structure, each with a different purpose.

The Program Inserts Records into Database

For each of the 5 table insertions, an industry-standard "insert" SQL statement is created, which is exemplified in this preferred embodiment.

INSERT INTO backups (backupdatetime, servername, clientname, clientfqhostname, clientnickname, targetname, backupproductname, backuplevel, backupcanonicallevel, backupdatetimelocal, backupbytes, backupfilecount, backuperrorcount, dayofweek, hourofday, backupvolume) VALUES('8/19/00 23:31:01', 'skylab.backupreport.com', 'skylab.backupreport.com', 'skylab.backupreport.com', 'skylab', 'c:.backslash.Financial', 'NetWorker', 'incr', 'Incremental', '8/19/00 23:31:01', 14728, 13, −1, 'Sat', '23', 'tape-020')

This SQL INSERT statement is immediately understandable by anyone familiar to the art. It is constructed piece by piece to contain each of the fields and respective field contents required to add a single, unique record to the backups table. When the SQL statement is prepared, it is then "sent" to the SQL Server to be executed. For each record that the BX provides, the program creates and sends a new SQL Statement.

Insertion into the Backups Table BT:

These are the steps DUS takes to prepare each SQL Statement for the table B (see FIG. 3)T:

1. Field BX1 (see FIG. 3), the name of the computer that did the actual data backup, is placed directly into field BT (see FIG. 3)2.

2. Field BX2 (see FIG. 3), the name of the computer from which the backup server took data and backed it up, is placed directly into field BT2 (see FIG. 3).

3. Field BX3 (see FIG. 3), the complete name, that is, including the domain name that it belongs to, of the computer from which the backup server took data and backed it up, is placed directly into field BT4 (see FIG. 3).

4. Field BX3 (see FIG. 3) is taken again, and all text to the right of the first period in it, including that period, is stripped off (process p2, FIG. 3) and what is left is placed in field BT5 (see FIG. 3). This gives what is often referred to as the "nickname" or "short name".

5. Field BX4 (see FIG. 3), the name of the object that was backed up, example: c:.backslash.tempfiles, is taken, and placed directly into field BT6 (see FIG. 3).

6. Field BX5 (see FIG. 3), the name of the data backup product software product that did the backup, is placed directly into field BT7 (see FIG. 3).

7. Field BX6 (see FIG. 3), the name of the level of backup (for example "incr" meaning "incremental") that took place, is placed directly into field BT8 (see FIG. 3).

8. Field BX7 (see FIG. 3), the canonical level name, which is the "generalized" name computed by the BX to mean the same kind of backup level regardless of which data backup software product did the backup of data.

9. Field BX8 (see FIG. 3), the backup date and time as it occurred in the time zone, in which the backup occurred, is placed directly into field BT10 (see FIG. 3). This date and time field does not get changed.

10. Field BX8 (see FIG. 3) is taken again, and from it is calculated an adjusted date and time to produce the date and time of the database at the time of the backup (process p1 in FIG. 3), and the result is placed directly into field BT1 (see FIG. 3). For example, if the backup was performed on a server in New York at 9 PM, but the database is stored in San Francisco, the calculated time would be three hours less than what was taken from field BX8 (see FIG. 3), i.e., the result would be 6 PM. The hours difference used for this calculation is taken from field BT (see FIG. 3)2 in the servers table ST (see FIG. 3) from the record specified by field BX1 (see FIG. 3) and field BX5 (see FIG. 3).

11. In the preferred embodiment, the contents of field ST3 (see FIG. 3) was originally set when the program user added a backup server to the database, and specified the New York time zone.

12. Field BX8 (see FIG. 3) is taken again, and applying the Delphi language program code FormatDateTime ('ddd' . . . ), the result gives the 3-letter abbreviation for the day of week that that date falls on (process p3, in FIG. 3), for example "Tue", "Sat", etc. The result is placed into field BT14 (see FIG. 3). In the preferred embodiment, the invention uses Delphi is the software tool/language. It could just as easily have been written in another language like "BASIC" or "C++". Delphi was thought to be the optimal tool for us to use in this invention.

13. Field BX8 (see FIG. 3) is taken again, and by standard Delphi program code, taking the 11.sup.th and 12.sup.th digits, the hour of the day, in military time format, is obtained (process p4). That hour is placed in field BT15 (see FIG. 3).

14. Field BX9 (see FIG. 3) is taken, and placed directly into field BT11 (see FIG. 3).

15. Field BX10 (see FIG. 3) is taken, and placed directly into field BT12 (see FIG. 3).

16. Field BX11 (see FIG. 3) is taken, and placed directly into field BT13 (see FIG. 3).

When all field contents are thus placed in their respective fields in the SQL Statement, the SQL Statement is sent to the SQL Server for execution on the database. If the record already exists, that is, if that specific data backup activity record was already received by BX, the insertion will not occur. This is because the table was designed to allow only unique records. By unique, it is meant that only one record may exist with a specific combination of the following fields: BT1, BT2, BT3, BT6, BT7 in the table BT (see FIG. 3).

When all records in the batch from the BX are inserted (or attempted to be inserted), the lastupdated field (ST5, in FIG. 3) is updated with the latest backup date found in the batch. This allows the next request to narrow down what is asks for by only asking for the "newest" historical records of data backup activity. (See section "Sends refresh request to BX" earlier in this document).

Insertion into the Clients Table CT (FIG. 4):

These are the steps DUS takes to prepare each SQL Statement for the table CT:

1. Field BX1 (see FIG. 4), the name of the computer that did the actual backup of data, is placed directly into field CT2 (see FIG. 4).

2. Field BX2 (see FIG. 4), the name of the computer from which the backup server took data and backed it up, is placed directly into field CT1 (see FIG. 4).

3. Field BX3 (see FIG. 4), the complete name, that is, including the domain name that it belongs to, of the computer from which the backup server took data and backed it up, is placed directly into field CT3 (see FIG. 4).

4. Field BX3 (see FIG. 4) is taken again, and all text to the right of the first period in it, including that period, is stripped off (process p2) and what's left is placed in field CT4 (see FIG. 4). This gives what is often referred to as the "nickname" or "short name".

5. The text "Default" is placed into the field CT5 (see FIG. 4).

When all field contents are thus placed in their respective fields in the SQL Statement, the SQL Statement is sent to the SQL Server for execution on the database. If the record already exists, that is, if there is already a record in table CT (see FIG. 4) for that combination of fields CT1, CT2, CT3, (all in FIG. 4) the insertion will not occur. This is because the table was designed to allow only unique records. By unique, it is meant that only one record may exist with a specific combination of the following fields: CT1, CT2, CT3 in the table CT (see FIG. 4).

Insertion into the Validtargets Table VT:

These are the steps DUS takes to prepare each SQL Statement for the table VT (in FIG. 5):

1. Field BX1 (see FIG. 5), the name of the computer that did the actual backup of data, is placed directly into field VT1 (see FIG. 5).

2. Field BX2 (see FIG. 5), the name of the computer from which the backup server took data and backed it up, is placed directly into field VT2 (see FIG. 5).

3. Field BX3 (see FIG. 5), the complete name, that is, including the domain name that it belongs to, of the computer from which the backup server took data and backed it up, is placed directly into field VT3 (see FIG. 5).

4. Field BX3 (see FIG. 5) is taken again, and all text to the right of the first period in it, including that period, is stripped off (process p2 in FIG. 5) and what is left is placed in field VT4 (see FIG. 5). This gives what is often referred to as the "nickname" or "short name".

5. Field BX4 (see FIG. 5), the name of the object that was backed up, example: c:.backslash.tempfiles, is taken, and placed directly info field VT5 (see FIG. 5).

When all field contents are thus placed in their respective fields in the SQL Statement, the SQL Statement is sent to the SQL Server for execution on the database. If the record already exists, that is, if there is already a record in table VT (see FIG. 5) for that combination of fields VT1, VT2, VT3, VT5, all in FIG. 5, the insertion will not occur. This is because the table was designed to allow only unique target records. By unique, it is meant that only one record may exist with a specific combination of the following fields: VT1, VT2, VT3, VT5 in the table VT (see FIG. 5).

Insertion into the Backupproducts Table Pt (in FIG. 6):

These are the steps DUS takes to prepare each SQL Statement for the table PT (see FIG. 6):

1. Field BX5 (see FIG. 6), the name of the data backup software product that did the backup of data, is placed directly into field PT1 (see FIG. 6).

When all field contents are thus placed in their respective fields in the SQL Statement, the SQL Statement is sent to the SQL Server for execution on the database. If the record already exists, that is, if there is already a record in table PT (see FIG. 6) for the value in field PT1 (see FIG. 6), the insertion will not occur. This is because the table was designed to allow only unique data backup product name records. By unique, it is meant that only one record may exist with a given value for field PT1 (see FIG. 6) in the table PT (see FIG. 6).

When all field contents are thus placed in their respective fields in the SQL Statement, the SQL Statement is sent to the SQL Server for execution on the database. If the record already exists, that is, if there is already a record in table PT (see FIG. 6) for the value in field PT1 (see FIG. 6), the insertion will not occur. This is because the table was designed to allow only unique data backup product name records. By unique, it is meant that only one record may exist with a given value for field PT1 (see FIG. 6) in the table PT (see FIG. 6).

Figure 7:
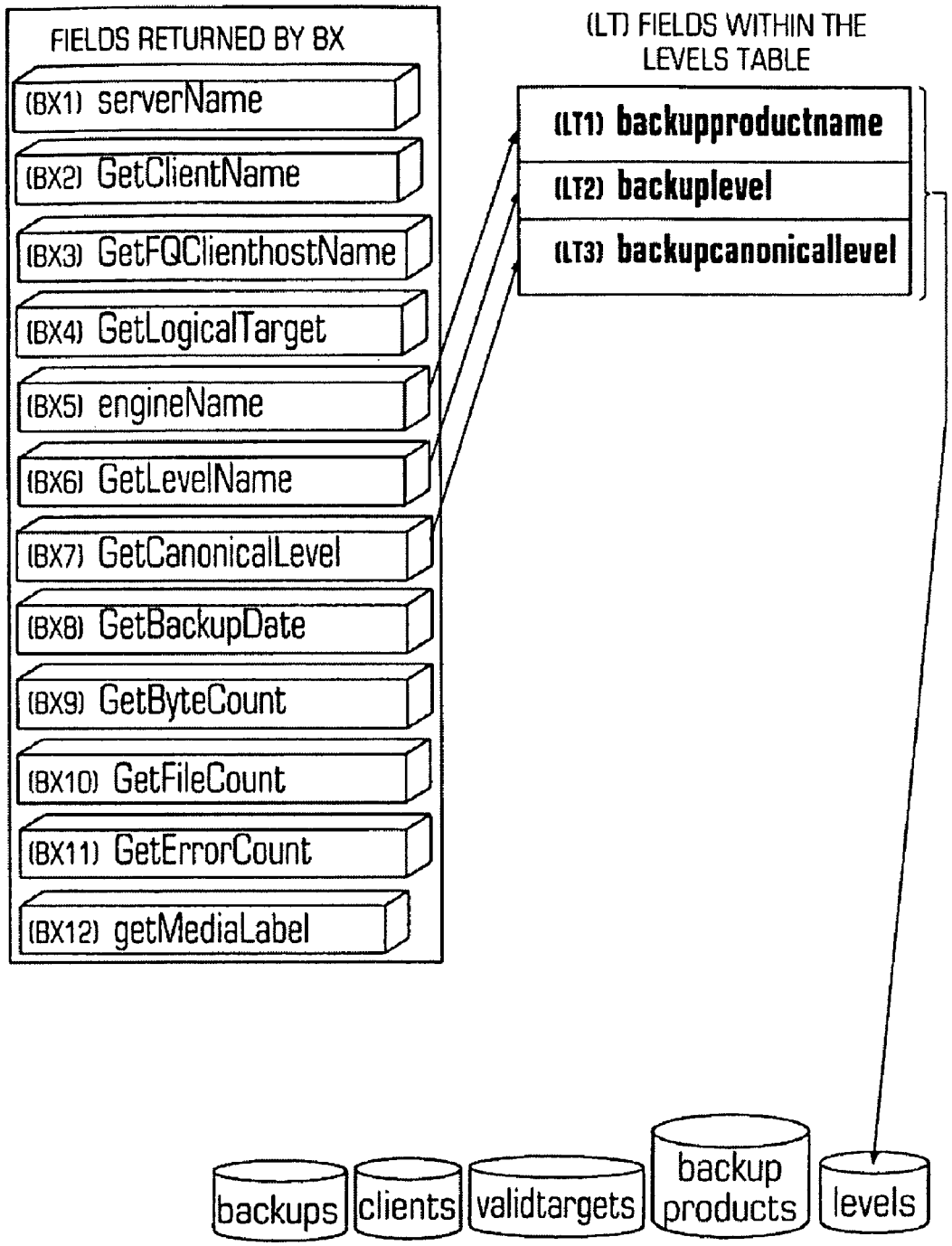
FIG. 7: A list of the fields returned by the embedded OCX (BX) showing where each field flows to. It also shows which fields in the levels table (LT) those fields are inserted into.

Insertion into the levels table LT (in FIG. 7):

These are the steps DUS takes to prepare each SQL Statement for the table LT (see FIG. 7):

Field BX5 (see FIG. 7), the name of the data backup software product that did the backup of data, is placed directly into field LT1 (see FIG. 7). Field BX6 (see FIG. 7), the piece of text that describes the data backup level, for example "incremental" used by the data backup software product that did the backup of data, is placed directly into field LT2 (see FIG. 7). Field BX7 (see FIG. 7), the equivalent generic backup level name, is placed directly into field LT3 (see FIG. 7).

After the Batch of Records is Inserted

When DUS has cycled through all of the records supplied by the BX and inserted them into the database as described above, DUS then changes the field RT5 (see FIG. 2) to the value "Finished" for the record whose taskid is the one DUS just processed.

In the preferred embodiment, changing a request in RT (see FIG. 2) to "Finished" is done by constructing a SQL Statement that changes the record whose taskid is the one that was supplied by BX and we just finished with. The typical SQL statement to do this looks like this:

Date of Last Update Stored

The field ST5 (see FIG. 3) is updated with the highest date/time value that was received in the batch of records that came from BX. This is referred to by the program the next time it makes a refresh request to the BX for the same server. (This is described in detail in the section "Sends refresh request to the BX", earlier in this document).

Alternate Embodiments

Although in the preferred embodiment an embedded software component is used to communicate with the Backup Engines, an alternative embodiment would be to communicate with the Backup Engines directly.

Advantages

1. Flexibility. Because historical records of data backup activity from a plurality of data backup software devices is stored in a single, consolidated, cross-referenced, open relational database, there exists a new opportunity to the user of the invention: the ability to create their own, "custom" reports using industry-standard report writing devices such as Crystal Reports™, Microsoft Access™ or one of dozens of others available in the marketplace. It also allows the user of the invention to set the times of the day at which DUS is to request new historical records of data backup activity.

2. Automation: A software device that can be set up once, and can run with little or no further attention as it continues to extract and make available historical records of data backup activity from a plurality of data backup software devices.

3. Transparency: By isolating the data backup software devices "behind" BX in the fashion described, and thus giving them the same generic interface, it allows the program code to be written only once knowing that it will work for all other data backup software devices that are added to the BX.

4. Cost Savings: By removing the need to have a technical understanding of a plurality of data backup software devices, a significant reduction in the cost of expertise is attained over the expertise required when not using the invention.

5. Minimum Impact: The invention can be used without installing any software on backup servers, or interfering with those installations in any way.

CONCLUSION, RAMIFICATIONS AND SCOPE

We have provided a solution to the problem of lack of adequate data backup reporting solutions, in particular for a plurality of data backup devices.

What is claimed is:

1. An automatic refresh request generation device for a data backup system having a plurality of data backup products, each data backup product connected to a computer network and each data backup product generating records relating to the data backup activity for the data backup product, the device comprising:
   a backup engine plug-in that obtains records of data backup activity from the plurality of data backup products and consolidates the records in a database that allows cross-referencing between the records from the plurality of data backup products; and
   a refresh request unit that operates in the background of the device, wherein the refresh periodically wakes up and determines if an hour of the current day has changed based on a string of values to determine if a refresh request is automatically initiated and stores a current time in a memory.

2. The device of claim 1, wherein the refresh request unit wakes up every few seconds.

3. A system for automatic refresh requests for a data backup system having a plurality of data backup products, each data backup product connected to a computer network and each data backup product generating records relating to the data backup activity for the data backup product, the system comprising:
- a computer network with data backup activity performed by a plurality of data backup products wherein each data backup product generates records relating to the data backup activity;
- a host computer connected to the computer network that executes a backup device, wherein the backup device comprising a backup engine plug-in to obtain records of data backup activity from each data backup product and a refresh request unit that determines if an automatic refresh request is to be initiated, wherein the refresh request unit comprises an RT table having a request field, a requestor name field, a reference field, a backup product name field, a status field, a taskid field and a request date and time field.

4. A computer implemented method for an automatic refresh request for a plurality of data backup products connected to a computer network, each data backup product generating records relating to the data backup activity for the data backup product, the method comprising:

- obtaining, by a backup engine plug-in, records of data backup activity from the plurality of data backup products;
- consolidating the records in a database that allows cross-referencing between the records from the plurality of data backup products;
- periodically waking a refresh request unit to determine if an hour of the current day has changed based on a string of values; and
- determining, if the hour of the current day has changed, if a refresh request is automatically initiated.

5. The method of claim 4 further comprising deleting, in a database, a record for a data backup product that has a status field in the database marked as finished when the refresh request unit periodically wakes up.

6. The method of claim 5 further comprising initiating a refresh request for a data backup product that has the status field marked as waiting.

* * * * *